July 14, 1942.  C. F. KUEBLER  2,289,506
BRAKE
Filed July 16, 1940   2 Sheets-Sheet 1
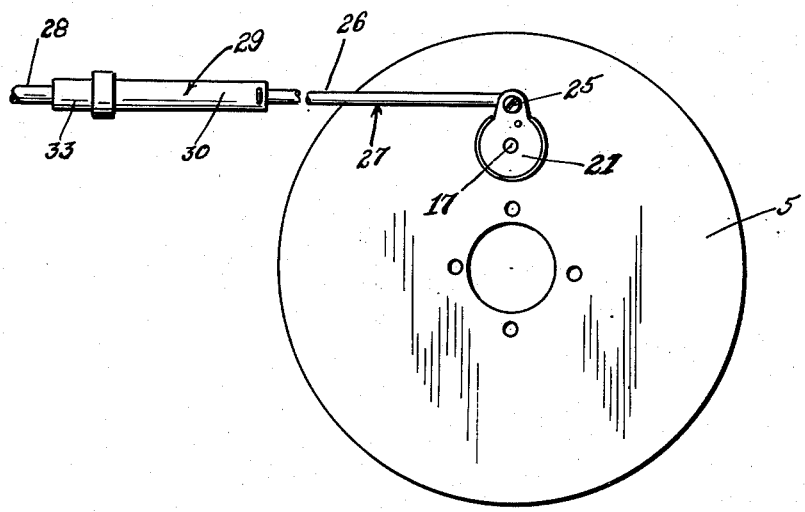
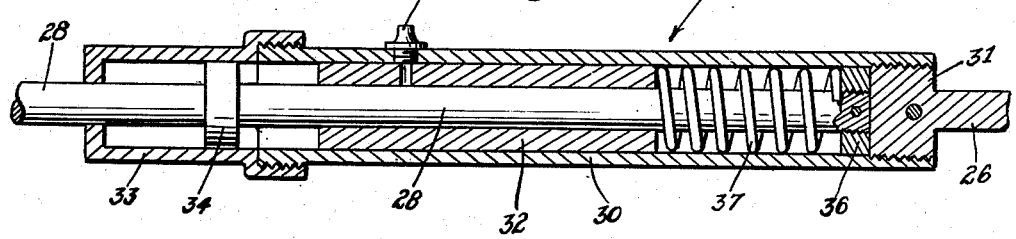
Inventor
Carl F. Kuebler
By Clarence A. O'Brien
Attorney July 14, 1942.  C. F. KUEBLER  2,289,506
BRAKE
Filed July 16, 1940  2 Sheets-Sheet 2
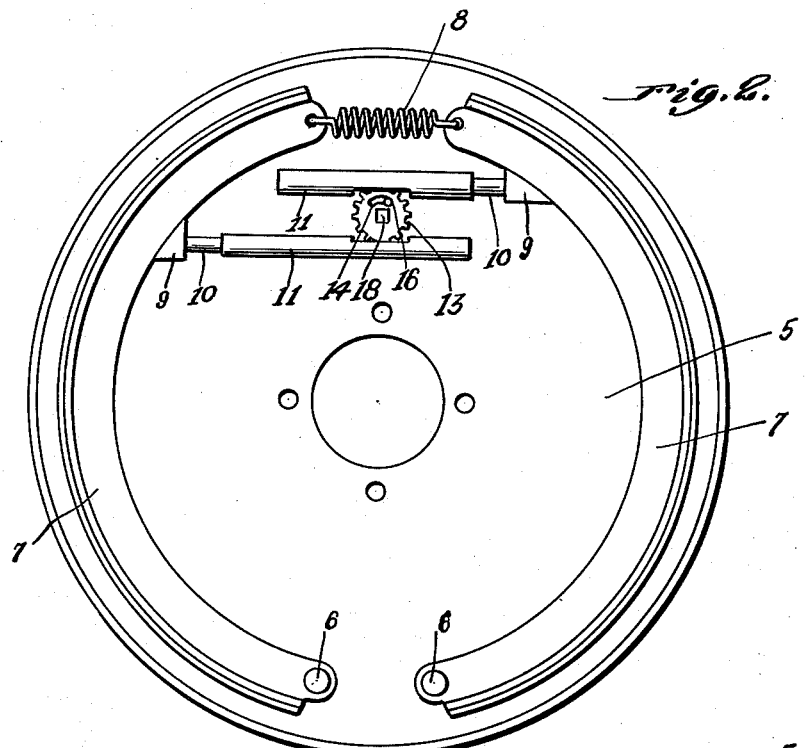
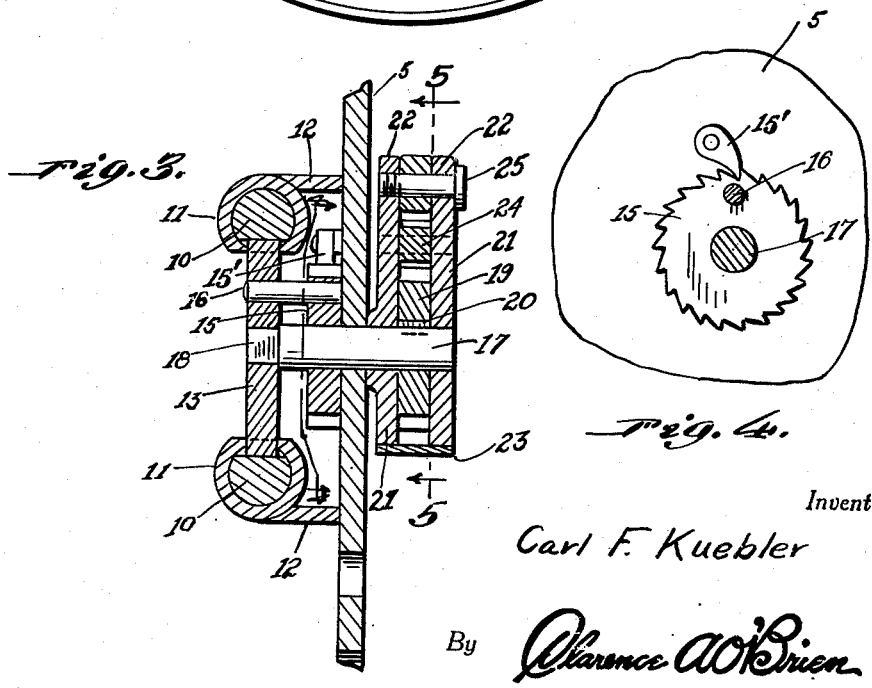
Inventor
Carl F. Kuebler
By Clarence A. O'Brien
Attorney Patented July 14, 1942

2,289,506

UNITED STATES PATENT OFFICE 2,289,506

BRAKE

Carl F. Kuebler, Evansville, Ind.

Application July 16, 1940, Serial No. 345,785

1 Claim. (Cl. 188—79.5)

This invention appertains to new and useful improvements in brakes of the mechanical type.

The principal object of the present invention is to provide means in conjunction with mechanical brakes whereby wear and slackness are automatically compensated, to the end that various adjustments which now must be periodically on mechanical brakes are disposed with.

Other objects and advantages of the invention will become apparent to the reader of the following specification.

In the drawings—

Figure 1 represents a side elevational view showing the stationary wall of a brake structure and the brake line extending thereto.

Figure 2 is an inside elevational view of the wall shown in Figure 1, disclosing the brake shoe operating means.

Figure 3 is an enlarged fragmentary vertical sectional view through the brake shoe operating means.

Figure 4 is a fragmentary elevational view taken on the line 4—4 of Figure 3 showing the inside ratchet and pawl assembly.

Figure 5 is a fragmentary detailed sectional view taken substantially on the line 5—5 of Figure 3.

Figure 6 is a longitudinal sectional view through the brake line connector.

Referring to the drawings wherein like numerals designate like parts, it can be seen in Figure 2, that numeral 5 denotes a stationary brake structure wall to which are pivoted, as at 6, brake shoes 7, which at their free ends are connected by a tension spring 8.

In carrying out the present invention each of the shoes 7 adjacent its free end has a boss formation 9 from which projects an elongated half round rack bar 10 toothed at its underside. These rack bars 10 extend into slotted tubes 11, which are supported in parallel horizontal spaced relation by flanges 12 projecting outwardly from the aforementioned wall 5.

The slotted portions of the tubes 11 are in opposed relation and have peripheral portions of a gear 13 extending through the same to mesh with the teeth of the rack bars 10.

The gear 13 has a concentrically disposed arcuate slot 14, which receives a pin projecting laterally from a ratchet wheel 15, this pin being denoted by numeral 16.

A short shaft 17 is journaled through the wall 5 and is squared at one end as at 18 for disposition into a correspondingly shaped opening in the gear 13. The ratchet wheel 15 is freely rotatable on the shaft 17 and has a pawl 15' engageable with the teeth thereof, this pawl being pivotally mounted on the wall 5.

On the shaft 17 at the other side of the wall 5 is a ratchet wheel 19 keyed to the shaft 17 as at 20. A pair of substantially circular plates 21 having arms 22 are rotatably mounted on the shaft 17, one at each side of the ratchet wheel 19, and a semi-circular shaped spring band 23 bridges these plates 21 and serves to form a housing wall for the ratchet wheel 19 and a pivotal pawl 24 which is mounted between the arms 22.

A machine screw or the like 25 serves to pivotally connect a section 26 of a brake line 27 to the arms 22.

The brake line 27 also consists of a brake line section 28, and these sections are connected together by a connector generally referred to by numeral 29.

This connector consists of an elongated barrel 30 having one end internally threaded to accommodate a threaded head 31 on the corresponding end of the rod line section 26.

A sleeve 32 is located in the barrel 30 and has the brake line section 28 slidably disposed therethrough.

A cap structure 33 of cylindrical shape has the rod section 28 slidably therethrough and a piston formation 34 thereon slidable in the said cap structure 33. Numeral 35 denotes lubricating means for the rod section 28.

A collar 36 is threadedly disposed on the rear free end of the rod section 28 and between this and the adjacent end of the sleeve 32 is a compression spring 37.

Obviously, if any looseness or slackness develops between the various brake lines of a vehicle, this looseness or slackness will be taken up by the connectors 29.

Any differentiation in the shoes 7 between the brake units of a vehicle due to various reasons such as wear, will be compensated for by reason of the action of the ratchets 19 and 15. Obviously, the object is to have the pawl 15' hold the ratchet wheel 15 as it is advanced by excessive movement due to operation of the gear 13 against the pin 16, thus preventing return of the gear 13. Thus an automatic means for tightening or adjusting the brakes is provided.

In the operation of this brake, the braking power is started by a pull on rod 28 which is constructed in sections 28 and 26. This rod 28 advances until the ring 34 reaches the end of cylinder 33 (see Figure 6) at which time the brake rod units 26, 28, 29 will move as a unit, pulling the arm 22 (see Figure 5) thereby turning ratchet wheel 19 by means of the pawl 24. The ratchet wheel 19 is secured to the axle 17 by means of a key 20 which acts to turn the gear 13 (see Figure 2) secured to the axle 17, which as it turns spreads the brake shoes in a ball and socket union 9, thus applying the brake bands to the drums. The individual and automatic adjustment of each brake is obtained by the combined efforts of ratchet wheel 15 (see Figure 4) mounted under the cog wheel 13 (see Figure 3), the ratchet wheel 15 which turns freely on the axle 17 and which is connected to cog 13 only by means of a pin 16 extending through a slot 14 in the gear 13, said gear 13 being adapted to be operated by the brake rod through the ratchet wheel 19. In making an adjustment on any brake that has worn or is loose, when the brake pedal is applied, rod 28 moves forward and since the brake bands are loose, the expansion spring 37 (see Figure 6) remains expanded and pulls therethrough the entire assembly forward, turning the ratchet wheel 19 (see Figure 5) and also the cog gear 13 (see Figure 3) which in turn advances the ratchet wheel 15 by acting on pin 16, the latter being engaged by one end of the slot 14 as the gear 13 is caused to be rotated more than the normal amount due to wear, thus advancing the pawl 15' to the next tooth on this ratchet wheel 15. As the brake pedal is released, this ratchet wheel remains stationary and the cog gear 13 by means of the slot 14 therein turns back to free the bands and is then held stationary by the pin 16 reaching the opposite end of the slot 14. At this point the external ratchet gear is also stationary therefore forcing the brake rod backward and permitting the pawl 24 (see Figure 4) to advance to the next tooth on the ratchet 19 thereby compensating for the adjustment on the internal ratchet 15.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a brake apparatus, a pair of brake shoes, said brake shoes being pivotally mounted, means between the free ends of the brake shoes for expanding the shoes, said means consisting of a rack projecting from each of the shoes and being disposed in spaced overlapping relation, a gear interposed between the rack and meshing with the teeth thereof, a ratchet wheel freely mounted for rotation in one direction only having a pin projecting therefrom, a concentric slot in the gear through which the pin projects, a shaft for the gear, and a ratchet drive for rotating the shaft to operate said expanding means.

CARL F. KUEBLER.